Aug. 5, 1969  E. D. GARNER  3,459,435
BABY STROLLERS
Filed Aug. 21, 1967  4 Sheets-Sheet 1
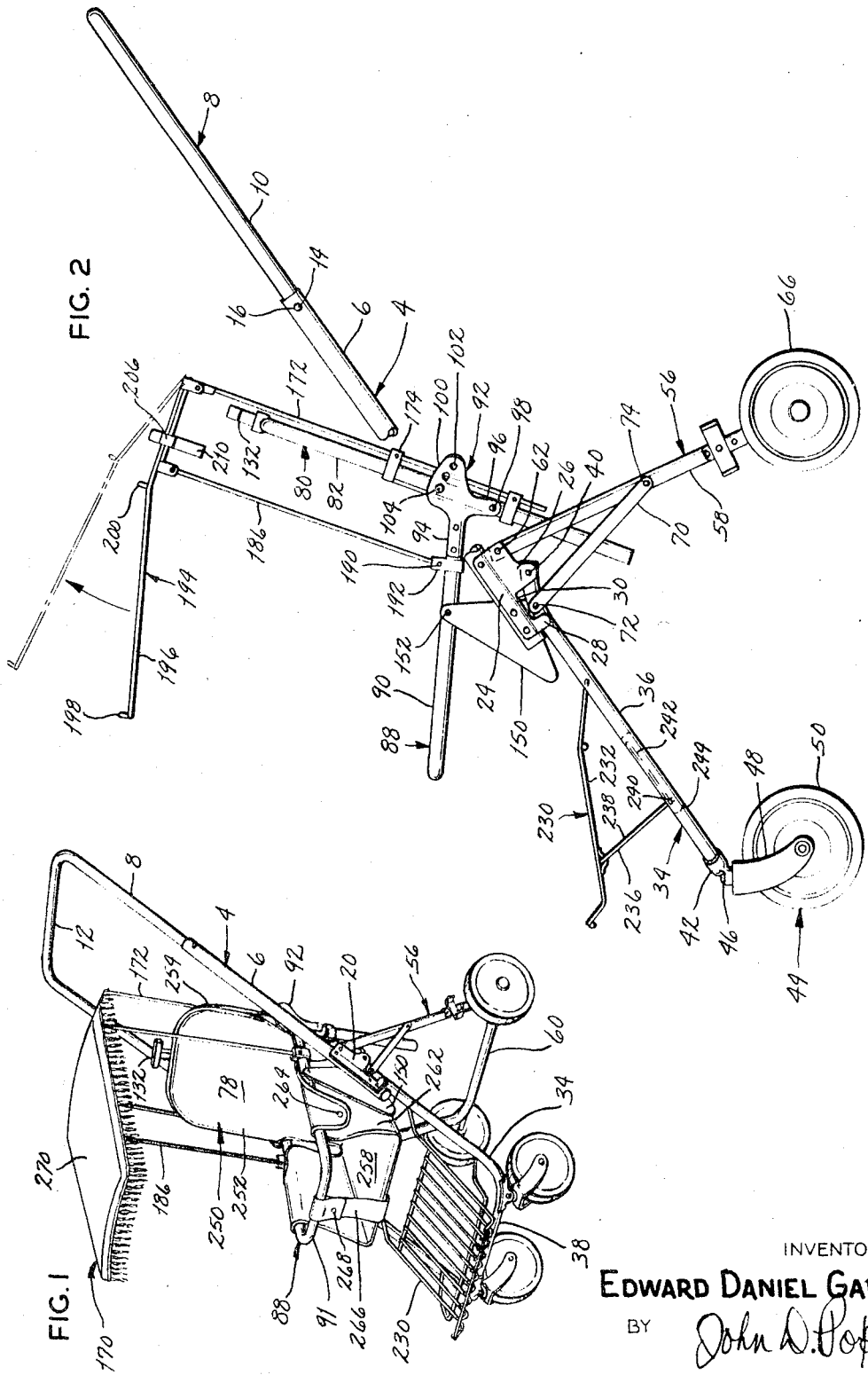
INVENTOR
EDWARD DANIEL GARNER
BY John D. Pope III
ATTORNEY

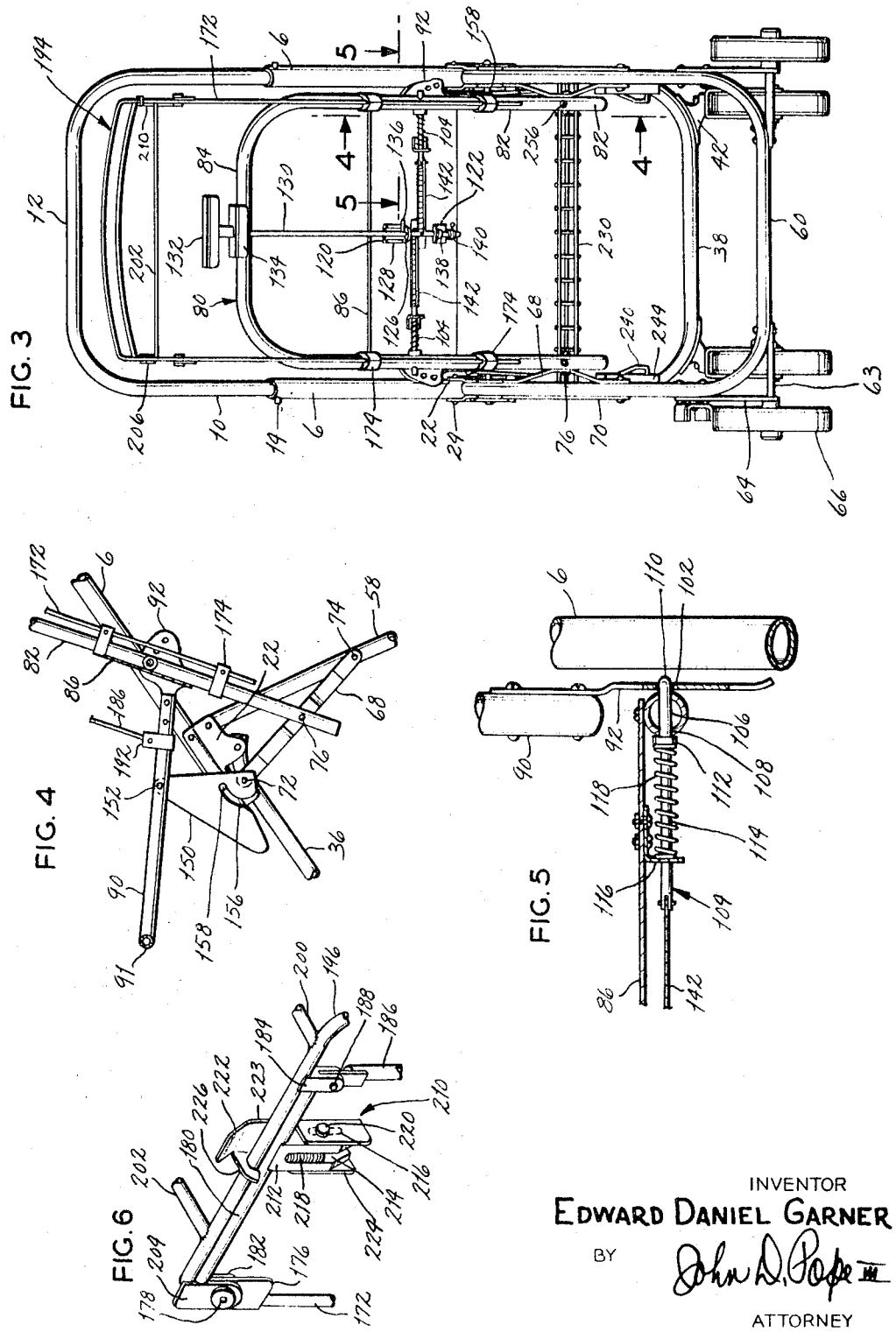

Aug. 5, 1969　　　E. D. GARNER　　　3,459,435
BABY STROLLERS

Filed Aug. 21, 1967　　　　　　　　　　4 Sheets-Sheet 3

INVENTOR
EDWARD DANIEL GARNER
BY
ATTORNEY

Aug. 5, 1969  E. D. GARNER  3,459,435
BABY STROLLERS
Filed Aug. 21, 1967  4 Sheets-Sheet 4
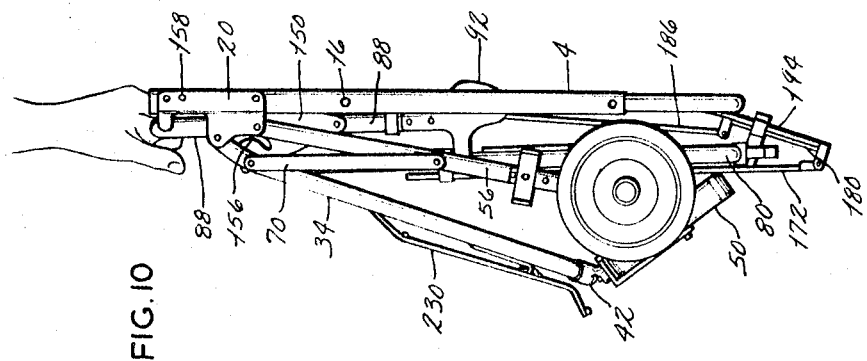
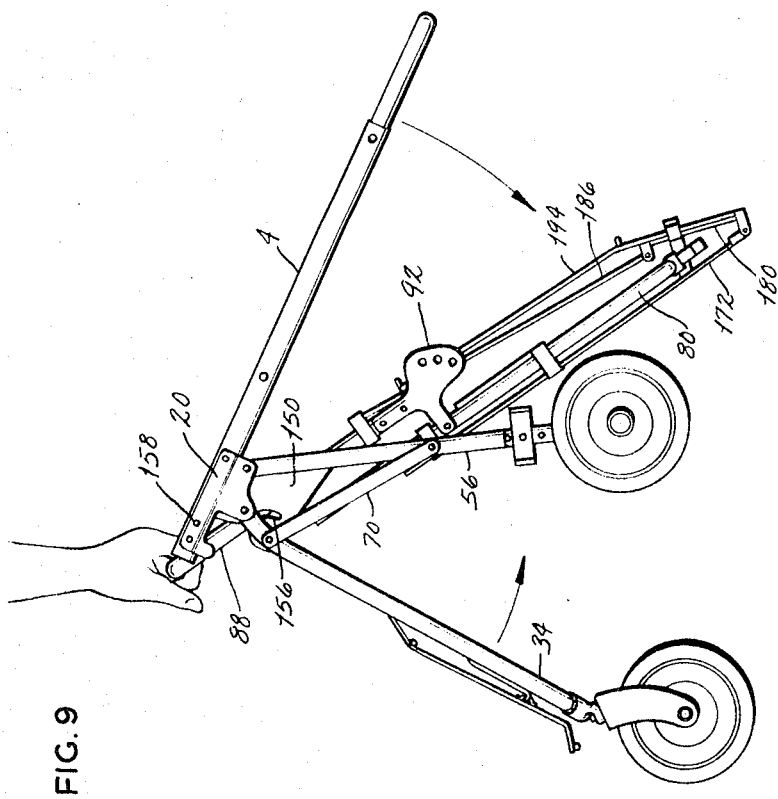
INVENTOR
EDWARD DANIEL GARNER
BY
*John D. Pope III*
ATTORNEY

United States Patent Office 3,459,435
Patented Aug. 5, 1969

3,459,435
BABY STROLLERS
Edward Daniel Garner, Lincoln, Nebr., assignor to
Herschal F. Garhan, Rising City, Nebr.
Filed Aug. 21, 1967, Ser. No. 662,067
Int. Cl. B62b 1/04, 3/02, 7/06
U.S. Cl. 280—41
7 Claims

ABSTRACT OF THE DISCLOSURE

A baby stroller having foldable upper, front and rear frames which carry foldable back and seat frames. A fabric cover is attached to the back and seat frames and includes a padded seat section suspended from the seat frame for supporting a child. The upper, front and rear frames are hingedly connected to one another so that they fold into side-by-side relation. The back and seat frames also fold down against the rear frame so that all the frames can be folded into a highly compact configuration. The seat frame is partially supported by side plates which have arcuate grooves adapted to receive and contain locking studs on the upper frame when the back and seat frames are in their erected positions. Accordingly, the upper frame is prevented from moving with respect to the front frame when the back frame is erected, and the rear frame is also prevented from moving with respect to the front frame by means of links interconnecting the two.

---

This invention relates to baby strollers and, more particularly, to a collapsible baby stroller.

Many baby strollers of current manufacture are collapsible to a limited extent to enable the user to more conveniently fit the stroller into limited areas such as automobile trunks and closets. These baby strollers, however, merely collapse into a somewhat depressed configuration, and when collapsed they are far too large and awkward to be carried onto buses and into other areas where space is at a premium. Moreover, these strollers are difficult to collapse and generally require the use of both hands to do so. This presents a problem when no one else is available to hold the baby. Furthermore, the canopy or sun shield generally must be removed from conventional strollers before they can be collapsed and this is an additional inconvenience.

Among the several objects of the present invention may be noted the provision of a baby stroller which can easily be collapsed into a compact package for carrying and storage purposes; the provision of a baby stroller which employs simple easily manipulated locking means to hold it in its erected position; the provision of a baby stroller in which the canopy folds down against the remaining portions of the stroller when it is collapsed; and the provision of a baby stroller which is attractive in appearance, rugged in construction, and economical to manufacture. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated.

FIG. 1 is a perspective view of a baby stroller constructed in accordance with and embodying the present invention;

FIG. 2 is a side elevational view of the baby stroller;

FIG. 3 is a rear elevational view of the baby stroller;

Figure 7:
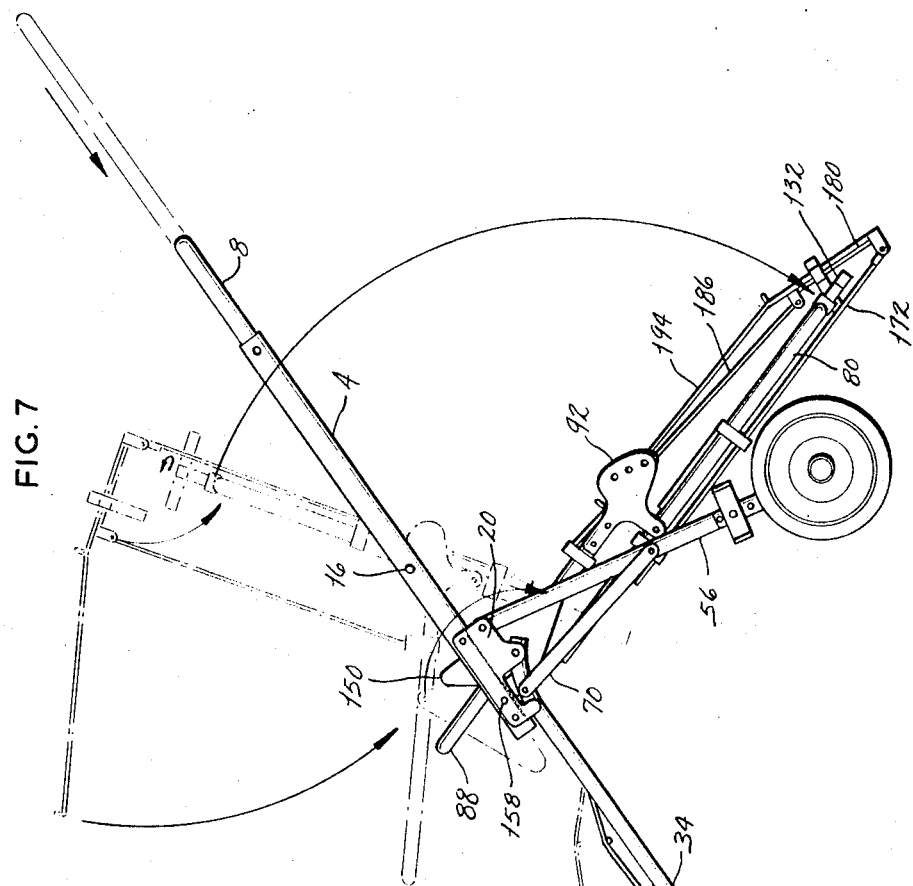
Figure 8:
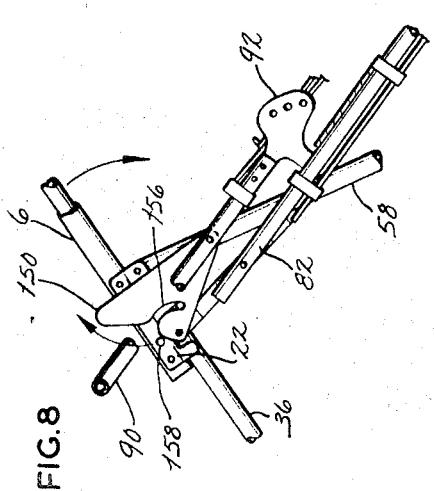

FIGS. 4 and 5 are sectional views taken along lines 4—4 and 5—5, respectively, of FIG. 3;

FIG. 6 is a fragmentary perspective view of a canopy lock forming part of the present invention;

FIG. 7 is a side elevational view showing the backrest in its collapsed position;

FIG. 8 is a fragmentary sectional view showing the relationship between the side plate and the locking pin of the present invention when the backrest is in its collapsed position;

FIG. 9 shows the baby stroller being collapsed; and

FIG. 10 is a side elevational view of the baby stroller in its completely collapsed position.

Corresponding reference characters indicate corresponding parts throughout the several views of the drawings.

Referring now to FIGS. 1 and 2 of the drawings, 2 designates a baby stroller having an upper frame 4 including a pair of tubular side members 6 and a U-shaped handle portion 8. Handle portion 8 integrally includes a pair of tubular legs 10 which are connected at their ends by a handle 12. Legs 10 telescopically fit within side members 6 so that handle portion 8 can move from an extended position to a retracted position. One of legs 10 is provided at its inner end with a spring-loaded button 14 which registers with and projects outwardly through either one of a pair of apertures 16 formed in the corresponding side member 6. One of apertures 16 is located near the outer end of side member 6 so that when button 14 engages it, handle portion 8 will be in its extended position, while the other aperture 16 is located near the opposite end of side member 6 for holding handle portion 8 in its retracted position.

Riveted or otherwise fastened to the lower ends of side members 6 are hinge brackets 20, each comprising inner and outer hinge plates 22, 24, which project downwardly in spaced relation to one another. Hinge plates 22, 24, include rearwardly presented hinge tabs 26 and outwardly flared guide ears 28 which are separated from one another by elongated downwardly opening notches 30.

Hingedly connected to upper frame 4 at hinge brackets 20 is a U-shaped front frame 34 including a pair of parallel side legs 36 which integrally merge at their lower ends into a transversely extending front cross-member 38. At their upper ends, legs 36 fit intermediate hinge plates 22, 24, of hinge brackets 20, and beyond guide ears 28 they are bowed slightly downwardly and are connected to hinge tabs 26 by means of pins 40. By means of this construction it is possible for front frame 34 to fold over into side-by-side relation with respect to upper frame 4. When legs 36 move forwardly from this position toward their erected position wherein they form continuations of side members 6, outwardly flared guide ears 28 will engage them and prevent any lateral displacement or swaying.

At the arcuate junctures of legs 36 and front cross-member 38 front frame 34 is provided with a pair of forwardly projecting mounting brackets 42 which pivotally carry a pair of conventional caster-type wheel assemblies 44. It is, therefore, sufficient to note that each wheel assembly 44 includes a vertical pintle 46 which rotates within one of mounting brackets 42 and is secured at its lower end to a curved fork 48 having a wheel 50 pinned intermediate the furcations thereof.

Also hingedly connected to upper frame 4 at hinge brackets 20 is a U-shaped rear frame 56 including a pair of parallel side legs 58 which at their lower ends integrally merge into a transversely extending rear cross-member 60. The extreme upper ends of legs 58 are located intermediate hinge plates 22, 24, of hinge brackets 20 and are journaled to tabs 26 by means of pins 62 which are located somewhat closer to side members 6 than are pins 40. By means of this construction it is possible for rear frame 56 to fold over against upper frame 4. Furthermore, inasmuch as pins 40 are located somewhat further outwardly from side members 6 than are pins 62, and further by reason of the fact that the upper ends of legs 36 are bowed outwardly, it is possible for front frame 34 to fold over onto the folded rear frame 56, in which position side members 6 and side legs 36, 58, will be located in side-by-side relation with respect to one another.

Riveted to rear cross-member 60 of rear frame 56 (FIG. 3) are a pair of laterally projecting axles 63 which are outwardly engaged and braced by a pair of reinforcing plates 64, the upper ends of which are riveted to the outwardly presented faces of legs 58. Mounted on each axle 63 beyond its reinforcing plate 64 is a rear wheel 66.

Interconnecting the approximate mid-portions of legs 58 and legs 36 at a point intermediate guide ears 28 and hinge tabs 26 of hinge brackets 20 are pairs of inner and outer connecting links 68, 70, the former of which are bowed somewhat inwardly intermediate their ends (see FIG. 3). Links 68, 70, are pivotally secured to legs 36, 58, by means of pins 72, 74. It should be noted that the upper ends of links 68, 70, are disposed within notches 30 when frames 34, 56, are in their erected position.

Hingedly connected to the inwardly bowed portions of inner links 68 by means of pins 76 is a backrest 78 including a U-shaped back frame 80 having a pair of parallel side legs 82 which are transversely connected at the upper ends by an upper cross-member 84. Also interconnecting legs 82 in downwardly spaced relation from cross-member 84 is a back plate 86. Projecting forwardly from back frame 80 at back plate 86 is a U-shaped seat member or frame 88 including a pair of side rails 90 which integrally merge at their forward ends into a hand rail 91. At their rear ends side rails 90 are fitted with hinge plates 92, each of which integrally includes a forwardly projecting ear 94 which is rigidly affixed to the outwardly presented surface of a side rail 90 by rivets. Hinge plates 92 further comprise a depending tab 96 which is connected at its lower end to a leg 82 of back frame 80 by means of a pin 98, and an enlarged upper portion 100 which is flared outwardly at its rear end and is further provided with a plurality of arcuately spaced apertures 102 located along equal radii emanating from pin 98.

Referring to FIG. 5, apertures 102 register with and accept locking pins 104 which are mounted for axial shifting movement on back frame 80. Each pin 104 includes an end portion 106 which is slidably fitted within apertures 108 formed in a leg 82 and is provided at its outer end with a rounded nose portion 110 which projects through any one of apertures 102 and thereby prevents relative swinging movement between back frame 80 and seat frame 88. End portion 106 inwardly terminates at a diametrally enlarged shoulder portion 112 which, in turn, merges into an elongated shank 114. Near its inner end, shank 114 extends through an angled guide bracket 116 which is riveted to the rear face of back plate 86. Interposed between shoulder portion 112 and bracket 116 and coiled around shank 114 is a coil-type compression spring 118 which biases locking pin 104 or more particularly nose portion 110 thereof outwardly into apertures 102 in hinge plate 92.

Also rigidly affixed to the rear face of back plate 86, preferably by means of rivets, are a pair of spaced brackets 120, 122, having outwardly projecting tabs provided with axially aligned apertures (FIG. 3). Bracket 120 is integrally provided with a pair of rearwardly projecting side flanges 128. Journaled within apertures in the tabs of brackets 120, 122, and extending upwardly therefrom and through upper cross-member 84 is an actuating rod 130 which is rigidly provided at its upper end with a T-shaped handle 132, the bottom face of which rides upon an attractively finished plastic bearing plate 134 located on upper cross-member 84. Immediately above the tab of bracket 120, rod 130 is provided with a radially projecting pin 136 which engages flanges 128 and thereby limits rotation of rod 130 in both directions. Immediately below the tab of bracket 122, rod 130 is fitted with a collar 138 to prevent upward withdrawal of rod 130. Encircling rod 130 below collar 138 and attached thereto at one of its ends is a coil-type torsional spring 140 which is secured at its opposite end to back plate 86 while under torsion so that a torque is constantly applied to rod 130. This torque urges pin 136 against one of flanges 128 except when handle 132 is turned. Interconnecting the portion of rod 130 located intermediate brackets 120, 122, and the inner ends of pins 104 located beyond brackets 116 are chains 142. Accordingly, when handle 132 is turned so as to rotate pin 136 from one flange 128 to the other, chain 142 will wind up on rod 130 and withdraw nose portions 110 of pins 104 from apertures 102, thereby freeing seat frame 88 for swinging movement relative to back frame 80.

As will be seen by reference to FIGS. 2 and 4, seat frame 88 is supported forwardly from hinge plates 92 by means of triangular side plates 150. Each side plate 150 is pinned to a side rail 90 at one of its apices by means of a pin 152 and at another apex is journaled to a leg 36 on front frame 34 by pin 72. Interposed between link 68 and side plate 150 on pin 72 and located within notch 30 of hinge plate 22 is a spacer collar to prevent the adjacent hinge bracket 20 from interfering with the operation of side plate 150. The third apex of side plate 150 is located along but not fastened to leg 36 in forwardly spaced relation to hinge bracket 20. Inwardly from pin 72 side plate 150 is provided with a downwardly opening arcuate slot 156 located concentric to pin 72, and projecting into this slot from the lower end of side member 6, to which it is rigidly affixed, is a locking stud 158 which engages the margins of slot 156 and thereby prevents relative movement between upper frame 4 and front frame 34. The inner margin of slot 156 remains concentric to pin 72, but the outer margin thereof beyond a predetermined point diverges outwardly in the provision of a camming margin which, in turn, merges into the bottom edge of triangular side plate 150.

Attached to back frame 80 and seat frame 88 is a canopy assembly 170 including a pair of rear support rods 172 which are securely fastened to legs 82 by means of clamp-type mounts 174. At their upper ends (FIG. 6) rods 172 are provided with flat end plates 176 and pivotally connected thereto by means of a pin 178 are connecting rods 180 having flattened end plates 182 at one end and bifurcated hinge brackets 184 at their opposite ends. End plates 182 pivot on pins 178 against end plates 176, while brackets 184 are connected to the upper ends of forward support rods 186 which are journaled intermediate the furcations thereof by means of pins 188. At their lower ends forward support rods 186 are journaled on pins 190 intermediate the furcations of bifurcated mounts 192 which are rigidly fastened to side rails 90 of seat frame 88 adjacent the forward ends of tabs 96 on hinge plates 92.

Support rods 172, 186, carry a canopy frame 194 comprising side rods 196 which are transversely connected by a forward upwardly bowed cross-rod 198, an intermediate upwardly bowed cross-rod 200, and a substantially straight rear cross-rod 202. Rearwardly beyond intermediate cross-rod 200, side rods 196 are bent slightly downwardly and rest upon connecting rods 180. At their extreme rear ends side rods 196 are fitted with downwardly projecting hinge tabs 204 which are journaled to rear support rod 172 on pins 178. One of connecting rods 180 is provided with a pair of upwardly projecting guide-forming ears 206 which engage the adjacent side rod 196 and prevent lateral movement of canopy frame 194.

The other connecting rod 180 carries a canopy lock 210 consisting of a depending mounting element 212 which is provided with a central channel 214 and a pair of elongated slots 216. Fitted into channel 214 is a coil-type compression spring 218 which bears against a cross-pin 220 fitted through slots 216. Cross-pin 220, in turn, carries a locking element 222 including an upwardly extending bight portion 223 and a pair of flanges 224 which fit over the forward and rear faces of mounting element 212. At its upper end, locking element 222 carries a laterally projecting tab 226 having a downwardly extending notch which receives the adjacent side rod 196. Locking element 222 moves from a latched position wherein tab 226 engages side rod 196 to an unlatched position wherein element 222 is pivoted outwardly so tab 226 is free of side rod 196. In the latter position, canopy frame 194 can be pivoted upwardly with respect to connecting rod 180 and support rods 172, 186.

Hingedly mounted on front frame 34 is a footrest 230 including a pair of side rods 232 which turn outwardly at their ends and project through apertures in side legs 36 adjacent the forward apices of side plates 150. Intermediate side rods 232 footrest 230 is provided with a wire grid-like portion having an upturned forward end. Hingedly fastened to side rods 232 is a cross-rod 236 which turns rearwardly in the provision of support sections 238 having outwardly turned terminal portions 240 which project into elongated slots 242 formed in guide members 244 located on legs 36. By means of this construction it is possible to elevate footrest 230 from a lowered position where it more or less rests on the upper surfaces of legs 36 to an elevated position wherein it is substantially horizontal.

Back frame 80 and seat frame 88 are fitted with an attractive fabric cover 250 including a padded back portion 252 which conforms to the configuration of back frame 80. Sewed along the upper and side margins of back portion 252 is a back panel 254, and cover 250 is slipped over back frame 80 so that padded back portion 252 and back panel 254 envelop it. The upper margins of panel 254 and back portion 252 are free from one another for a sufficient distance to accommodate handle 132 and bearing plate 134. At its lower corners, back panel 254 is fastened to the lower ends of legs 82 of back frame 80 by means of snaps 256. Connected to back portion 252 along the lower margin thereof is a padded seat portion 258 which is internally fitted with a rigid reinforcing member. Extending upwardly from the side margins of seat portion 258 are side panels 262 which fold over side rails 90 of seat frame 88 forwardly of side plates 150 and are secured to themselves by snaps 264. Seat portion 258 is centrally provided along its forward margin with a support strap 266 which extends upwardly and folds over hand rail 91. Strap 266 is fastened to itself beyond hand rail 91 by means of a snap 268.

Canopy frame 194 is covered with a fabric canopy cover 270 which is formed from upper and lower panels marginally sewed together along three sides so as to envelop the various rods forming canopy frame 194. The extreme end of the upper panel folds over rear cross-rod 202 and is fastened to the lower panel, thereby completely masking rods 196–202. Along its side margins canopy cover 270 is cut away so as not to interfere with the operation of canopy lock 210 or ears 206.

In use, a child is placed in stroller 2 in the conventional manner, after first releasing canopy lock 210 and swinging canopy cover 270 and canopy frame 194 upwardly. This is accomplished by merely pressing bight portion 223 of locking element 222 inwardly so that tab 226 rides up over side rod 196 against the bias of spring 218. Thereafter canopy frame 194 is lowered and is secured in its lowered position by pressing locking element 222 toward side rod 196 so that tab 226 will engage it. The inclination of back frame 80 can be adjusted merely by rotating handle 132 and allowing pins 104 to project into other sets of apertures 102. When pins 104 are in the rearmost pair of apertures 102, it is desirable to raise footrest 230 to its upper position wherein it forms a substantially horizontal continuation of padded seat portion 258 and thereby supports the child's legs.

Referring now to FIGS. 7 through 10, erected stroller 2 can be transformed into a highly compact carrying package within a matter of seconds and by the us of only one hand. This is accomplished by first pressing spring-loaded button 14 inwardly through upper aperture 16 and simultaneously pushing handle 12 toward back frame 80 until button 14 snaps outwardly into the lower aperture 16. Next, the user lifts the child out of stroller 2 and while holding the child with one arm reaches beneath handle 12 and rotates T-shaped handle 132, thereby withdrawing pins 104 from apertures 102. This permits back frame 80 to swing downwardly toward rear wheels 66 into a position wherein its side legs 82 are presented in sde-by-side relation with respect to side legs 58 of rear frame 56. As back frame 80 folds rearwardly, seat frame 88 will be pulled rearwardly and side plates 150 will swing over center toward legs 82 of back frame 80, thereby presenting seat frame 88 in a position slightly above back frame 80 (FIG. 7). As seat frame 88 folds toward back frame 80, support rods 172, 186, on one hand and connecting rods 180 and side rails 90 on the other hand function similarly to a parallel linkage and bring canopy frame 194 into overlying relation with respect to back frame 80.

When back frame 80 is folded downwardly into substantially side-by-side relation with rear frame 56, as illustrated in FIG. 7, side plates 150 will be rotated rearwardly to the extent that their arcuate slots 156 no longer contain or restrict the movement of studs 158 (FIG. 8). Therefore, at this point upper frame 4 is free to pivot with respect to front and rear frames 34, 56. The user merely grasps hand rail 91 of seat frame 88 and lifts upwardly in order to bring stroller 2 into its completely collapsed position. When this is done front frame 34 will swing on hinge brackets 20 toward rear frame 56 by reason of the moment created by the relatively heavy weight of wheel assemblies 44 on the extreme outer or forward end of front frame 34. Upper frame 4 will simultaneously fold in the opposite direction toward collapsed back frame 80 and canopy frame 194, by reason of the cooperative action between, and the geometry of, front frame 34, rear frame 56, links 68, 70, and hinge brackets 20 (FIGS. 9 and 10).

Stroller 2 is converted from its collapsed position to its erected position just as easily and as quickly. The user merely grasps upper frame 4, preferably at handle 12, and lifts it upwardly. As this occurs, front frame 34 and rear frame 56 will swing into their open or erected positions due to the weight of such frames and this leaves stroller 2 in the semi-erected position illustrated in FIG. 7. When wheels 50, 66, are on a supporting surface, frames 4, 34, 56, remain in this position without requiring outside support from the person erecting it. Thereafter, the user merely grasps forward cross-rod 198 on canopy frame 194 and lifts upwardly and through the action of support rods 172, 186, and connecting rods 180, brings back frame 80 upwardly. Back frame 80 itself or handle 132 can also be grasped to accomplish this same end. Pins 104 will approach enlarged upper portions 100 of hinge plates 92 and the outwardly flared portions thereof will eventually engage pins 104 and cam them inwardly until they snap outwardly into the rearmost pair of apertures 102. Back frame 80 will at this point be in its reclined position. At this point side plates 150 have swung forwardly and their arcuate slots 156 contain and prevent lateral movement of studs 158. Inasmuch as studs 158 are rigidly attached to upper frame 4, the latter is precluded from moving with respect to front frame 34 and rear frame 56. At this point the child can be placed back in the stroller. To bring back frame 80 into more inclined positions, handle 132 is merely rotated and at the same time back frame 80 is urged forwardly.

As has been pointed out above the foregoing operations for both collapsing and erecting stroller 2 can be performed by the use of one hand. Thus, the user's other hand and arm are free for holding the child.

Cover 250 and canopy 270 have been omitted from FIGS. 2–10 so as not to obscure the various structural elements of stroller 2. It is sufficient to note that cover 250 merely folds with frames 80, 88, while canopy cover 270 folds with frame 194 and neither interferes with the movement of the various structural elements of stroller 2.

In view of the above, it will be seen that the several objects of the invention are achieved and other advantageous results attained.

What is claimed is:

1. A collapsible baby stroller comprising a first and a second frame; hinge means for swingably connecting said first and second frames to one another so that they can be folded from an erected position wherein they are disposed at predetermined angles with respect to one another to a collapsed position wherein they are presented substantially in side-by-side relation; a backrest hingedly mounted with respect to said first and second frames and adapted to fold from at least one back-supporting position to a collapsed position; a seat member hingedly connected to said backrest and adapted to fold with said backrest when said backrest is moved to its collapsed position; and support means being pivotally secured to said seat member and said first frame and engaging said second frame when said backrest is in said back-supporting position so as to prevent relative movement between said first and second frames; said support means being disengaged from said second frame when said backrest is in its collapsed position so that said first and second frames can be moved into collapsed position.

2. A stroller according to claim 1 wherein said support means is a rigid element pivotally connected to said seat member and said first frame.

3. A stroller according to claim 2 wherein said support means includes an arcuate slot and said second frame includes a stud which projects into said slot when said first and second frames are in said erected position, said stub being free of said slot when said backrest is in its collapsed position.

4. A stroller according to claim 1 wherein said first frame extends below said seat member and said second frame extends above said backrest when said first and second frames are in said erected position.

5. A stroller according to claim 1 wherein a third frame is pivotally connected to said second frame, said backrest being in side-by-side relation with said third frame when in its collapsed position.

6. A stroller according to claim 1 wherein a third frame is pivotally connected to said second frame and connecting links hingedly connect said first frame and said third frame for holding those frames at a predetermined angle when said first and second frames are in said erected position.

7. A stroller according to claim 1 and further characterized by locking means carried by said backrest for engaging said seat member and preventing relative movement between said seat member and said backrest.

References Cited

UNITED STATES PATENTS

| | | | |
|---|---|---|---|
| 2,678,219 | 5/1954 | Goodman | 280—41 |
| 3,084,949 | 4/1963 | Forster | 280—36 |
| 3,191,958 | 6/1965 | Smith | 280—36 |

BENJAMIN HERSH, Primary Examiner

ROBERT R. SONG, Assistant Examiner